Patented Feb. 7, 1950

2,496,697

UNITED STATES PATENT OFFICE

2,496,697

STYRENE-SUBSTITUTED BENZALACETO-PHENONE COPOLYMERS

Earl C. Chapin, Dayton, Ohio, assignor to Monsanto Chemical Company, St. Louis, Mo., a corporation of Delaware No Drawing. Application January 30, 1948, Serial No. 5,484

5 Claims. (Cl. 260—63)

This invention relates to the production of valuable resinous products by the conjoint polymerization of styrene and substituted benzalacetophenones, and to the novel copolymers produced thereby. More particularly this invention relates to polymers of styrene having improved physical and chemical properties.

Polystyrene is a valuable and useful article of commerce but its applications are considerably limited by its inadequate thermal stability. It is the primary object of this invention to provide a modified polymer of styrene having superior physical and chemical characteristics. A further purpose of this invention is to prepare new copolymers having unusually high heat distortion points and high softening temperatures.

In accordance with this invention it has been found that styrene will readily copolymerize with certain substituted benzalacetophenones although the latter compositions are not in themselves polymerizable. Suitable benzalacetophenones are those defined by the structural formula:

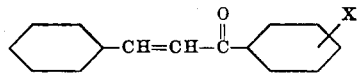

wherein X is a radical of the group consisting of methoxy and chlorine. The beneficial result is unusual and could not have been expected, since the unsubstituted compound benzalacetophenone, is polymerizable only with difficulty and its copolymers are quite different in physical properties.

The substituted benzalacetophenones may be prepared by the reaction of benzaldehyde with suitable acetophenone derivatives in ethanol solution in the presence of a basic catalyst, such as sodium hydroxide. The reaction may be conducted at 6° C. to 25° C. The resulting benzalacetophenone derivative is purified by recrystallization from ethanol.

In the practice of this invention styrene and the substituted benzalacetophenones are mixed in any desired proportion and heated to effect a polymerization. Generally from 50 to 98 percent of styrene and from 50 to 2 percent of the substituted benzalacetophenones are used, although especially desirable copolymers are prepared by the conjoint polymerization of 70 to 95 percent of styrene and from 5 to 30 percent of the benzalacetophenones. It is usually desirable to use mass polymerization methods in the practice of this invention, whereby the mixed monomers are catalyzed with from 0.005 to 1.0 percent by weight of a peroxy compound, such as benzoyl peroxide, hydrogen peroxide, acetyl peroxide, t-butyl hydroperoxide, or another compound having in its structure a peroxide linkage (—O—O—). The rate of polymerization will depend upon the temperature, the quantity and particular nature of the catalyst used. The most effective temperatures lie between 50° C. and 200° C., but frequently it is desirable to initiate the polymerization at a lower temperature and gradually, or periodically, increase the temperature as the polymerization proceeds. Generally from five to 200 hours are required to complete the reaction and produce a clear, transparent, solid resin, but frequently longer periods of time are used. The solid polymer produced in accordance with this invention is usually ground to particles of the desired size, which may be used in the manufacture of molded articles or for any other purpose for which polystyrene is customarily used.

Emulsion copolymers may be prepared by heating the mixed monomers in an aqueous medium, by tumbling the reaction vessel, by stirring, or by other means of agitating the reactants, for the purpose of maintaining the monomer in finely divided suspension in the water. Usually an emulsifying agent is used, for example rosin soap, sodium alkyl sulfate, sulfonated hydrocarbon, water soluble salt of high molecular weight fatty acids and mixtures thereof, obtained by the saponification of animal and vegetable oils, and other compounds containing both hydrophobic and hydrophilic radicals. When the polymerization is complete the solid polymer is obtained by direct drying the emulsion or by precipitating the polymer from the emulsion and separating it by filtration. The methods employed to precipitate the polymer from the emulsion are (1) freezing, (2) addition of an electrolyte and (3) addition of methyl or ethyl alcohol. The copolymer in finely divided form as obtained by the filtration or direct drying operation may be used directly as a molding powder.

Further details of the preparation of the new copolymers are set forth in the following detailed examples.

Example 1

A mixture of 10 parts by weight of benzal-p-methoxy acetophenone and 90 parts of styrene was mixed with 0.05 part of benzoyl peroxide and heated for twelve days at 85° C. and then seven days at 130° C. The resulting copolymer had an air bath heat distortion of 92.5° C., whereas a sample of polystyrene polymerized under identical conditions had an air bath heat distortion point of 78° C.

Example 2

A mixture of 80 parts by weight of styrene and 20 parts of benzal-p-chloro-acetophenone was mixed with 0.1 percent by weight of benzoyl peroxide and heated for nineteen days at 70° C. and for seventeen days at 100° C. The resulting hard, clear, solid polymer had a heat distortion point of (A. S. T. M. oil bath) of 97° C. as compared to 78° C. for polystyrene prepared under identical conditions.

Although the invention has been described with respect to certain specific embodiments thereof, it is not intended that the details shall be construed as limitations upon the scope of the invention except to the extent incorporated in the following claims.

I claim:

1. A copolymer of from 50 to 98 percent by weight of styrene and from 50 to two percent of a compound having the structural formula:

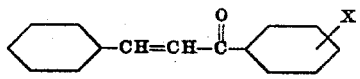

wherein X is a radical of the group consisting of methoxy and chlorine.

2. A copolymer of 50 to 98 percent styrene and from 50 to 2 percent of benzal-p-methoxy-acetophenone.

3. A copolymer of 50 to 98 percent styrene and from 50 to 2 percent of benzal-p-chloro-acetophenone.

4. A method of preparing a copolymer which comprises mixing from 50 to 98 percent of styrene with from 50 to two percent of a benzalacetophenone having the structural formula:

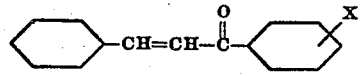

wherein X is a radical of the group consisting of methoxy and chlorine, heating the mixed monomers in the presence of a peroxy catalyst, and recovering the resulting copolymer.

5. The method defined by claim 4, wherein the copolymers are prepared in an aqueous medium with vigorous agitation in the presence of an emulsifying agent.

EARL C. CHAPIN.

REFERENCES CITED

The following references are of record in the file of this patent:

UNITED STATES PATENTS

| Number | Name | Date |
| --- | --- | --- |
| 1,937,063 | Meisenburg et al. | Nov. 28, 1933 |

FOREIGN PATENTS

| Number | Country | Date |
| --- | --- | --- |
| 484,599 | Great Britain | May 9, 1938 |

OTHER REFERENCES

Stobbe et al.: J. prakt. Chem., vol. 123, p. 1, 1929.